United States Patent
Kanega et al.

(10) Patent No.: US 7,420,017 B2
(45) Date of Patent: Sep. 2, 2008

(54) PROCESS FOR PRODUCING FLUOROCOPOLYMER

(75) Inventors: Jun Kanega, Kitaibaraki (JP); Shigeru Kumamoto, Kitaibaraki (JP); Takashi Enokida, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 232 days.

(21) Appl. No.: 10/550,479

(22) PCT Filed: Mar. 12, 2004

(86) PCT No.: PCT/JP2004/003330

§ 371 (c)(1),
(2), (4) Date: Sep. 23, 2005

(87) PCT Pub. No.: WO2004/085492

PCT Pub. Date: Oct. 7, 2004

(65) Prior Publication Data

US 2006/0235157 A1    Oct. 19, 2006

(30) Foreign Application Priority Data

Mar. 24, 2003    (JP) ............................. 2003-080770

(51) Int. Cl.
*C08F 114/18*    (2006.01)
(52) U.S. Cl. .................... 525/326.2; 525/199; 525/374; 242/247; 242/250; 242/255
(58) Field of Classification Search ................ 525/199, 525/374, 326.2; 526/242, 247, 250, 255
See application file for complete search history.

(56) References Cited

U.S. PATENT DOCUMENTS

| | | | | |
|---|---|---|---|---|
| 4,946,902 | A * | 8/1990 | Bekiarian et al. | 525/326.2 |
| 5,861,464 | A   | 1/1999 | Goldmann et al. | |
| 6,172,162 | B1 * | 1/2001 | Mouri | 525/199 |
| 6,503,988 | B1 * | 1/2003 | Kitahara et al. | 525/326.2 |
| 6,703,461 | B1 * | 3/2004 | Tanaka et al. | 526/242 |
| 6,720,360 | B1 * | 4/2004 | Grootaert et al. | 521/28 |
| 2005/0107535 | A1 | 5/2005 | Funaki et al. | |

FOREIGN PATENT DOCUMENTS

| | | | |
|---|---|---|---|
| JP | (1993) 5-287151 A | | 11/1993 |
| JP | 9-183812 | * | 7/1997 |
| JP | (1997) 9-183812 A | | 7/1997 |
| WO | WO-95/02634 | * | 1/1995 |
| WO | WO 95/02634 A1 | | 1/1995 |
| WO | WO 97/08239 A1 | | 3/1997 |
| WO | WO 97/17382 A1 | | 5/1997 |
| WO | WO 99/50319 A1 | | 10/1999 |
| WO | WO 99/65954 A1 | | 12/1999 |
| WO | WO-2004/085492 A1 * | | 10/2004 |

OTHER PUBLICATIONS

Abstract, JP 9-500163, published Jan. 7, 1997, Applicant: E.I. DuPont de Nemours & Co.

* cited by examiner

*Primary Examiner*—Peter D. Mulcahy
*Assistant Examiner*—Henry Hu
(74) *Attorney, Agent, or Firm*—The Webb Law Firm, P.C

(57) ABSTRACT

A process for preparing a fluorine-containing copolymer by an emulsion polymerization method in the presence of aqueous ammonia as a pH modifier, and a molded article obtainable by melt molding or crosslinking molding the fluorine-containing copolymer. In preparing the fluorine-containing copolymer by coagulation of the fluorine-containing copolymer contained in a fluorine-containing copolymer dispersed aqueous solution, it is preferred to use a cationic surfactant and a water soluble organic solvent as a coagulating agent used for the above coagulation. The surfactant is preferably represented by the, formula $(R_4N^+)X^-$ wherein R is an alkyl group of 1 to 22 carbon atoms, a fluoroalkyl group obtainable by fluorine substituting at least a part of hydrogen atoms present in the above alkyl group or hydrogen, four R's may be the same or different provided that they are not hydrogen atoms simultaneously, and X is a halogen atom. The process for preparing a fluorine-containing copolymer provides a decrease in a concentration of metal elements, which act as an impurity source, for example, having a metal element concentration of not more than 1 ppm.

7 Claims, No Drawings

PROCESS FOR PRODUCING FLUOROCOPOLYMER

BACKGROUND OF THE INVENTION

1. Field of the Invention

The present invention relates to a process for preparing a fluorine-containing copolymer. More particularly, the present invention relates to a process for preparing a fluorine-containing copolymer in which the concentration of metal elements, which will be an impurity source, is lowered.

The present invention further relates to a fluorine-containing copolymer having a lowered concentration of metal elements, which will be an impurity source, and suitable, for example, for transportation rolls, sealing materials, hoses, tubes and the like in the field of liquid crystal and semiconductor production apparatuses, or polymer matrixes for forming polymer electrolytes of lithium secondary batteries in the electric field, and also relates to cross-linking (vulcanization) molded articles thereof.

2. Description of the Prior Art

Fluorine-containing copolymers generally tend to have enhanced chemical resistance, heat resistance and higher purity as compared with polyolefins or the like and have been conventionally used, for example, for molded articles such as transportation rolls, sealing materials, hoses, tubes and the like in the field of liquid crystal and semiconductor production apparatuses, or polymer matrixes for forming polymer electrolytes of lithium secondary batteries in the electric field.

In the liquid crystal and semiconductor production processes, impurities contained in the above molded articles formed from the fluorine-containing copolymers such as metal elements and the like are called particles and cause wafer surface contamination and thereby induce product defects. Therefore, the removal of metal elements remaining is an important subject with the view of improving the yield of products.

Accordingly, with regard to materials for use in liquid crystal and semiconductor production apparatuses, it is also desired to use materials incapable of generating impurity substances, which induce product defects.

In polymer electrolytes used for lithium ion secondary batteries, the inclusion of metal elements is undesirable because it is considered that the transfer of lithium ion will be interfered or other facts will be caused, to thereby induce a lowering of an ion conductivity of the polymer electrolyte or to induce a lowering of a discharge capacity in the cycle of charging and discharging.

Conventionally, fluorine-containing copolymers are prepared in the following manner. A fluorine containing copolymer dispersed aqueous solution synthesized by an emulsion polymerization method using a fluorine-containing anionic surfactant was dropped in an aqueous solution in which an inorganic salting out agent such as sodium chloride alone, or plural kinds of ones such as sodium chloride, potassium alum, magnesium chloride and the like with stirring and thereby the fluorine-containing copolymer contained therein is aggregated and isolated.

The salting out method, however, has a defect such that as the inorganic salting out agents used in salting out are contained and adsorbed in the fluorine containing copolymer together with aggregation of the fluorine containing copolymer, it is difficult to completely remove the inorganic salting out agents contained in the fluorine containing copolymer even if washing thereof with pure water is carried out repeatedly, and further fluorine containing copolymers having a high content of metal elements are undesirably prepared due to the inorganic salting out agent used.

As a method for isolating the fluorine containing copolymer without using a salting out agent, there is a freeze-coagulation method of carrying out coagulation by freezing a fluorine-containing copolymer dispersed aqueous solution. The fluorine containing copolymer prepared by this method has adsorbed and contained an anionic surfactant and a pH modifier used in the preparation of the copolymer so that the copolymer is disadvantageous for decreasing impurities and is not preferable in viewpoint of productivity.

As a method of isolating the fluorine containing copolymer without using the salting out method, there are a solution polymerization method and a solution suspension polymerization method.

In the case of preparing the fluorine containing copolymer in an elastomer region, it is advantageous to employ the emulsion polymerization method in view of the reactivity of the fluorine containing monomers and batch efficiency thereof.

The present invention solves the problems associated with the prior art by providing a process for preparing a fluorine containing copolymer which produces a high purity fluorine containing copolymer having a lowered concentration of metal elements from a fluorine containing copolymer dispersed aqueous solution prepared by an emulsion polymerization method, preferably an emulsion polymerization method without using metal element containing starting materials.

The present invention further provides a fluorine containing copolymer suitable, for example, for transportation rolls, sealing materials, hoses, tubes and the like in the field of liquid crystal and semiconductor production apparatuses, or polymer matrixes for forming polymer electrolytes of lithium secondary batteries in the electric field, wherein the uses are obtainable by melt molding or vulcanization (cross-linking) molding the fluorine containing copolymer prepared by the above method and have a lowered concentration of metal elements.

SUMMARY OF THE INVENTION

The process for preparing a fluorine containing copolymer by an emulsion polymerization method in the presence of a pH modifier according to the present invention is characterized by using aqueous ammonia as the pH modifier.

In the preferred embodiment of the present invention, it is preferred to use a cationic surfactant and a water soluble organic solvent as a coagulating agent in the preparation of the fluorine containing copolymer by coagulating a fluorine containing copolymer in a fluorine containing copolymer dispersed aqueous solution prepared with the emulsion polymerization method.

Furthermore, the cationic surfactant is preferably represented by the following formula:

in the formula, R is any one of an alkyl group of 1 to 22 carbon atoms, a fluoroalkyl group obtainable by fluorine replacement of at least one part of hydrogen atoms present in the alkyl group, and a hydrogen atom, four R's may be the same or different, provided that four R's are not hydrogen atoms simultaneously, and x is a halogen atom.

The emulsion polymerization is preferably carried out in the presence of an anionic surfactant as an emulsifying agent.

The fluorine containing copolymer of the present invention is obtainable by the above process and the resulting fluorine containing copolymer has a metal element concentration of not more than 1 ppm.

The fluorine containing copolymer melt molded article of the present invention is obtainable by melt molding the above fluorine containing copolymer.

The fluorine containing copolymer vulcanization molded article of the present invention is obtainable by vulcanization molding the above fluorine containing copolymer.

According to the process for preparing the fluorine containing copolymer according to the present invention, a high purity fluorine containing copolymer having a lowered metal element concentration is obtainable with a simple procedure from the fluorine containing copolymer dispersed aqueous solution prepared by the emulsion polymerization method, preferably the emulsion polymerization method without using the metal element containing raw materials.

The molded articles obtainable by melt molding or vulcanization (cross-linking) molding the fluorine containing copolymer prepared by the above method have a lowered concentration of metal elements and are suitable, for example, for transportation rolls, sealing materials, hoses, tubes and the like in the field of liquid crystal and semiconductor production apparatuses, or polymer matrixes for forming polymer electrolytes of lithium secondary batteries in the electric field.

DETAILED DESCRIPTION OF THE INVENTION

Hereinafter, the process for preparing the fluorine containing copolymer will be described in detail.

Process for Preparing Fluorine Containing Copolymer

In the process for preparing the fluorine containing copolymer according to the present invention, the fluorine containing copolymer is prepared with the emulsion polymerization method in the presence of aqueous ammonia as a pH modifier. In the preferred embodiment, the fluorine containing copolymer is collected by coagulating the resulting fluorine containing copolymer dispersed aqueous solution with a coagulating agent.

In the preferred embodiment of the present invention, a cationic surfactant and an aqueous organic solvent are used as the above coagulating agent.

Emulsion Polymerization

The process for preparing such a fluorine containing copolymer is divisionally described below. In the present invention, the fluorine containing copolymer is prepared by the emulsion polymerization method. The emulsion polymerization method is carried out using raw materials (for example, fluorine containing vinyl monomers such as vinylidene fluoride, chlorotrifluoroethylene and the like), an emulsifier, an initiator, water, preferably ion exchange water, aqueous ammonia as a pH modifier, and optionally a chain transfer agent (for example, methanol, ethanol and isopropanol). Any of these components does not desirably contain metal elements.

In the present invention, the emulsion polymerization is carried out using, as a pH modifier, a pH modifier free from metal elements, preferably aqueous ammonia without using a pH modifier containing metal elements (for example, disodium hydrogen phosphate 12-hydrate). Therefore, the present invention has an effect such that the fluorine containing copolymer in which the content of any of metal elements is lowered can be efficiently prepared by conducting the coagulation as described later. The aqueous ammonia is used in such an amount that the pH of the emulsion polymerization solution as a reaction solution is 5 to 8.

As an emulsifying agent, conventionally known anionic surfactants can be widely used. The anionic surfactants are preferably used in viewpoint of having a large difference in ζ-potential between the anionic surfactant and a cationic surfactant, which is one component in the coagulating agent as described later. As described above, variously known anionic surfactants can be used as an emulsifier in the present invention because the cationic surfactants having a ζ-potential opposite to that of the anionic surfactants may be used in coagulation. From the viewpoint of polymerization, in the case of selecting fluorine surfactants having a small chain transfer function, the anionic fluorine surfactants are particularly preferred, because the anionic surfactants have many kinds and a latex has good stability in polymerization.

Examples of the initiator (polymerization initiator) used herein may include peroxides (for example, inorganic peroxides such as ammonium peroxodisulfate and the like, and organic peroxides such as dialkyl peroxide and the like) and redox type water-soluble initiators. Now, it is desirable to not use peroxides for polymerization initiators containing metal elements (for example, sodium peroxodisulfate, potassium peroxodisulfate and the like) from the viewpoint of preparing the fluorine containing copolymer in which the metal element content is lowered.

Preferable examples of the anionic surfactant used as an emulsifier in the emulsion polymerization may include anionic surfactants not containing metal elements, such as ammonium perfluorooctanate ($NH_4^+[C_7F_{15}COO^-]$), ammonium perfluorononanoate ($NH_4^+[C_8F_{17}COO^-]$) and ammonium perfluoroheptanoate ($NH_4^+[C_6F_{13}COO^-]$).

These emulsifiers may be used in an amount such that the concentration thereof based on the components in the reaction solution containing the above components is usually from 0.1 to 20.0% by weight.

The concentration of the fluorine containing copolymer (solid component) prepared by emulsion polymerization in the above conditions in a reactor such as an autoclave or the like, in the reaction solution (fluorine containing copolymer dispersed aqueous solution), which is not particularly limited, is about from 5 to 40% by weight.

Coagulation

In the next place, the fluorine containing copolymer dispersed aqueous solution (reaction solution) is treated with the coagulating agent and thereby the fluorine containing copolymer is coagulated. In this procedure, the coagulating agent containing the cationic surfactant and the water soluble organic solvent is preferably used.

Preferable examples of the cationic surfactants may include those free from metal elements, i.e. cationic surfactants represented the following formula (A):

in the formula (A), R is any one of an alkyl group of 1 to 22 carbon atoms, a fluoroalkyl group obtainable by fluorine replacement of at least one part of hydrogen atoms present in the alkyl group, and a hydrogen atom, four R's may be the same or different, provided that four R's are not hydrogen atoms at the same time, and X is a halogen atom or an acetoxy group.

The metal free cationic surfactants represented by the formula (A) further may include:

alkyl ammonium chlorides optionally having a methyl group represented by the formula (A) wherein X is a halogen, particularly Cl (chlorine atoms), i.e. represented by the formula [I]

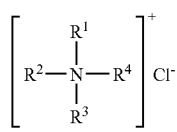

in the formula [I], $R^1$, $R^2$, $R^3$ and $R^4$ may be the same or different each other, $R^1$ shows an alkyl group, preferably a long chain alkyl group of 10 to 22 carbon atoms, $R^2$, $R^3$ and $R^4$ each show hydrogen, an alkyl group, preferably an alkyl group having 1 to 22 carbon atoms, a part or all the hydrogen atoms contained in $R^1$, $R^2$, $R^3$ and $R^4$ may be substituted with fluorine, such as monoalkyl monomethyl ammonium chloride, monoalkyl dimethyl ammonium chloride, monoalkyl trimethyl ammonium chloride, dialkyl dimethyl ammonium chloride, trialkyl monomethyl ammonium chloride and tetra-alkyl ammonium chloride, provided that the alkyl group in these compounds of the formula [I] is the same as $R^1$;

monoalkylamine acetates optionally having a methyl group represented by the formula (A) wherein X is an acetoxy group ($CH_3COO^-$), i.e. represented by the formula [II]:

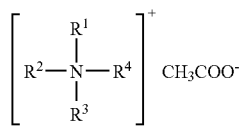

in the formula [II], $R^1$, $R^2$, $R^3$ and $R^4$ may be the same or different each other, $R^1$ shows an alkyl group, preferably a long chain alkyl group of 10 to 22 carbon atoms, $R^2$, $R^3$ and $R^4$ each show hydrogen, an alkyl group, preferably an alkyl group having 1 to 22 carbon atoms, a part or all the hydrogen atoms contained in $R^1$, $R^2$, $R^3$ and $R^4$ may be substituted with fluorine, such as monoalkyl amine acetate, monoalkyl dimethyl amine acetate and the like; and monoalkyl amines wherein the alkyl group has 1 to 22 carbon atoms.

At least one of the alkyl groups in each of the surfactants (compounds for surfactants) is preferably a long chain alkyl group having at least 10 carbon atoms, more preferably a long chain alkyl group having 10 to 18 carbon atoms. In the case the surfactant contains two or more alkyl groups, these alkyl groups may be the same or different each other.

Specific examples of the cationic surfactants may include lauryl trimethyl ammonium chloride, dodecyl trimethyl ammonium chloride, stearyl trimethyl ammonium chloride, distearyl dimethyl ammonium chloride, monoethanol amide stearate, lauryl amine acetate, stearyl amine acetate, and further, perfluoroalkyl-trimethyl-ammonium chlorides ($[C_nF_{2n+1}(CH_3)_3N]^{+\cdot Cl+}$ wherein n is an integer of about 1 to 22) obtainable by fluorinating these alkyl groups directly bonded to N atom in the above cationic surfactants.

Of these cationic surfactants, those represented by the formula $(R_4N^+)X^-$ wherein R is the same in the formula (A), X is a halogen atom, preferably Cl, or an acetoxy group ($CH_3COO^-$), more preferably X is Cl are preferred because, for example, they are easily available.

These cationic surfactants may be used singly or in combination with two or more.

If a coagulating agent containing a metal compound, for example, metal salts (such as calcium chloride, sodium chloride or potassium alum) is used in place of the above cationic surfactant, the content of metal impurities in the fluorine containing copolymer is increased in spite of the coagulation methods such as the freeze coagulation method or the like referred to in Comparative Examples 1 to 3 as described later.

Examples of the aqueous organic solvent may include:
alcohols particularly aliphatic alcohols of 1 to 10 carbon atoms such as methanol, ethanol and isopropanol;
amides such as dimethyl formamide and diethyl acetoamide;
ketones such as acetone and the like;
alkylene glycols such as ethylene glycol, triethylene glycol, tetraethylene glycol, dipropylene glycol, 1,2-propane diol, 1,3-propane diol, 1,2-butane diol, 2,3-butane diol, 1,3-butane diol, 1,4-butane diol, 1,2-pentane diol, 1,5-pentane diol, 2,5-hexane diol, 3-methy-1,3-butane diol, 2-methyl pentane-2,4-diol, 3-methyl pentane-1,3,5-triol, 1,2,3-hexane triol, and glycerin;
polyalkylene glycols such as polyethylene glycol and polypropylene glycol;
glycerols such as glycerol, diglycerol and triglycerol;
lower alkyl ethers such as ethylene glycol monomethyl ether, ethylene glycol monoethyl ether, diethylene glycol monomethyl ether, diethylene glycol monoethyl ether and diethylene glycol mono-n-butylether; and
thiodiethanol, N-methyl-2-pyrrolidone and 1,3-dimethyl-2-imidalydinone.

Of these water soluble organic solvents, alcohols such as methanol, ethanol, isopropanol and the like are preferred, and further, linear or branched aliphatic alcohols having 1 to 10 carbon atoms, particularly having 1 to 5 carbon atoms, are preferred from the viewpoint of compatibility with the above cationic surfactants.

These water-soluble organic solvents may be used singly or in combination with two or more.

In the present invention, as the cationic surfactant contained in the coagulating agent, the surfactants [I] typified by stearyl trimethyl ammonium chloride are particularly used, and further the combined use thereof with the above aliphatic alcohol as the water-soluble organic solvent is preferred because the coagulating properties are good and the cleaning properties are also good.

Although the amount of the cationic surfactant for use depends the concentration of the anionic surfactant contained in the fluorine containing copolymer dispersed water solution, the cationic surfactant is used in an amount of usually from 0.05 to 30.0% by weight, preferably 0.1 to 10.0% by weight in the coagulating agent containing the cationic surfactant and the water-soluble organic solvent, that is, the cationic surfactant is used in an amount of usually from 0.3 to 40 parts by weight, preferably 0.5 to 30.0 parts by weight based on 100 parts by weight of the water soluble organic solvent because the recovery of the fluorine containing copolymer due to coagulation and the cleaning properties are good.

When the amount of the cationic surfactant is less than the above range, the anionic surfactant contained in the fluorine containing copolymer dispersed aqueous solution cannot be sufficiently neutralized electrically and thereby the fluorine containing copolymer is hardly coagulated and the recovery of the fluorine containing copolymer tends to be lowered.

When the amount is over the above range, re-emulsification of the fluorine containing copolymer is caused during the coagulation and thereby the recovery of the fluorine containing copolymer is caused during the coagulation and the recovery of the fluorine containing copolymer due to coagulation tends to be lowered.

The coagulating agent containing the cationic surfactant and the water-soluble organic solvent is preferably used in an amount of usually from 0.5 to 10 times by weight, preferably 0.5 to 5.0 times by weight based on the amount of the fluorine containing copolymer dispersed aqueous solution from the viewpoint of the recovery of the fluorine-containing copolymer and the cleaning properties.

The reaction solution containing the coagulated fluorine containing copolymer is filtered to separate the water phase by a filtration method such as vacuum filtration, centrifugal filtration, pressure filtration and the like and the fluorine containing copolymer is prepared.

In the present invention, the cleaning and filtration of the fluorine containing copolymer with ion exchange water are desirably repeated so that the separated filtrate has an ion conductivity of not more than 10 μS/cm, preferably about 0.2 to 4.0 μS/cm, followed by drying to separate (prepare) a high purity fluorine containing copolymer in which metal element concentration is markedly decreased.

In the fluorine containing copolymer thus prepared according to the present invention, the concentration of metal elements (for example, Na, Mg, Al, K, Ca, Fe, Cu etc) is preferably as low as possible. The concentration of any of metal elements such as Na, Mg, Al or the like is usually not more than 2 ppm, particularly desirably not more than 1 ppm.

As described above, an usable method in the process for preparing the fluorine containing copolymer according to the present invention is an emulsion polymerization method, and preferably is an emulsion polymerization method using components (raw material monomer, emulsifying agent, pH modifier and the like), which do not contain metal elements as much as possible, particularly using aqueous ammonium as a pH modifier. Further, in the preparation of the fluorine containing copolymer by coagulation from the resulting fluorine containing copolymer dispersed aqueous solution, the high purity fluorine containing copolymer having a lowered concentration of each metal element (for example, not more than 1 ppm) can be prepared with a simple method, for example, using the coagulating agent free from metal elements.

Use of the Resulting Fluorine Containing Copolymer

The resulting fluorine containing copolymer thus separated and purified is submitted to use as a melt molded article by melt molding or as a vulcanization (crosslinking) molded article by vulcanization (crosslinking) molding.

The vulcanization molding of the unvulcanized fluorine containing copolymer is carried out using, for example, a vulcanizing agent such as organoperoxides and the like, and a crosslinking assistant (vulcanization assistant) such as polyfunctional monomers and the like.

For example, the referential example 3 described later shows a fluorine containing copolymer, which is a unvulcanized fluorine containing copolymer, obtainable by copolymerizing a vinylidene fluoride [VdF], tetrafluoroethylene [TFE], hexafluoropropylene [HFP], and a brominated and/or iodinated unsaturated fluorohydrocarbon as a crosslinking site such as 2-bromotetrafluoroethoxy trifluoroethene (FBrVE, Br—$C_2F_4$O—CF=$CF_2$).

In crosslinking (vulcanization) of the unvulcanized fluorine containing copolymer, for example, as shown in Example 3 described later, it is considered that the crosslinking is formed in such a manner that carbon-carbon double bond sites ($CH_2$=CH—) in triallyl isocyanate used as the vulcanization assistant are opened, bromines (Br) present in the crosslinking sites in the unvulcanized fluorine containing copolymer are pulled out using an organic peroxide such as 2,5-dimethyl-2,5-di(tert-butylperoxy) hexane and the like as a vulcanizing agent and the plural sites in the copolymer in which Br's are pulled out are linked to each other using a polyfunctional monomer such as triallyl isocyanate and the like as a crosslinking assistant (vulcanization assistant), and as a result, desired vulcanization (crosslinking) molded articles are prepared.

The resulting molded articles are suitably used for transportation rolls, sealing materials, hoses, tubes and the like in the field of liquid crystal and semiconductor production apparatuses, or polymer matrixes for forming polymer electrolytes of lithium secondary batteries in the electric field, because the content of any of the metal elements contained in the resulting molded articles is decreased to usually not more than 2 ppm, particularly not more than 1 ppm.

Using the process for preparing the fluorine containing copolymer according to the present invention, a high purity fluorine containing copolymer in which the concentration of any of various metal elements is remarkably decreased to, for example, not more than 1 ppm, and vulcanization (crosslinking) molded articles of the high purity fluorine containing copolymer can be prepared with a simple procedure from a fluorine containing copolymer dispersed aqueous solution prepared by an emulsion polymerization method preferably an emulsion polymerization method without using metal element-containing raw materials.

EXAMPLE

The process for preparing the fluorine containing copolymer according to the present invention will be described in more detail below with reference to as the following examples, but it should be not limited by the following examples.

Measurement of Metal Content

To 2 g of a fluorine containing copolymer as a specimen, 1 ml of concentrated sulfuric acid was added and incinerated with heating at 650° C. for 1 hr in an electric furnace.

The ash component obtained was dissolved in a diluted nitric acid (6N) and the determination of each metal was carried out by an ICP emission spectrometry.

Referential Example 1

To a 100 L volume SUS 316 made autoclave, 1.0 kg (2.3 mol) of perfluoroammonium octanate (anionic surfactant, $NH_4^+[C_7F_{15}COO^-]$), 0.02 kg (ammonia: 0.3 mol) of 25% aqueous ammonia (pH modifier) and 60 kg (3331 mol) of ion exchange water were charged and sufficiently de-aerated, and then as a chain transfer agent 0.01 kg (0.2 mol) of isopropanol and as initial charging 5 kg (78.1 mol) of vinylidene fluoride [VdF], 0.30 kg (2.6 mol) of chlorotrifluoroethylene [CTFE, ClFC=$CF_2$] were charged and heated to 55° C. The inner pressure of the autoclave was 2.5 MPa·G.

When the autoclave inside was at the above inner pressure, 0.05 kg (0.2 mol) of peroxoammonium disulfate (polymerization initiator) was introduced into the system by a metering pump to start polymerization reaction.

During the polymerization reaction, when the inner pressure of the autoclave was lowered to 2.4 MPa·G, vinylidene fluoride (VdF) was additionally fed to return the inner pressure to 2.5 MPa·G and this procedure was repeated until the amount of vinylidene fluoride (VdF) separately added was 15 kg (234.2 mol) provided that the amount is a VdF amount in successively introducing VdF, CTFE etc in a predetermined composition into the reaction system, in particular, the amount used herein is the total amount of VdF amounts successively added.

The other copolymerization monomer (that is CTFE) was also homogeneously added in a composition ratio VdF/CTFE of 97(% by mol)/3(% by mol) in accordance with the amount of VdF separately added, that is, the monomer mixture having a desired composition ratio was appropriately added to the reaction system and thereby the copolymerization reaction was advanced.

After completion of the addition, the reaction mixture was aged until the inner pressure was lowered to 0.5 MPa·G to complete the polymerization.

The aqueous dispersion solution taken out from the autoclave had a solid component concentration, as measured by a measuring method using an infrared moisture-meter in measuring conditions at 120° C. for 60 min, of 26% by weight. The measuring method referred to the following examples.

Referential Example 2

To a 100 L volume SUS 316 made autoclave,
2.1 kg (4.9 mol) of perfluoroammonium nonanoate (anionic surfactant, $NH_4^+[C_8F_{17}COO^-]$),
0.04 kg (0.6 mol) of 25% aqueous ammonia and
50 kg (2776 mol) of ion exchange water were charged and sufficiently de-aerated, and then as a chain transfer agent
0.01 kg (0.3 mol) of methanol and as initial charging
0.8 kg (0.3 mol) of tetrafluoroethylene [TFE],
2.2 kg (8.0 mol) of perfluoro(ethylvinylether) [FEVE] were charged and heated to 80° C. The inner pressure of the autoclave was 0.85 MPa·G.

When the autoclave inside was at the above inner pressure, 0.03 kg (0.1 mol) of peroxoammonium disulfate (polymerization initiator) was introduced into the system by a metering pump to start polymerization reaction.

During the polymerization reaction, when the inner pressure of the autoclave was lowered to 0.80 MPa·G, tetrafluoroethylene [TFE] was additionally fed to return the inner pressure to 0.85 MPa·G and this procedure was repeated until the amount of TFE separately added was 18.5 kg (185.0 mol) After completion of the addition, the reaction mixture was aged until the inner pressure was lowered to 0.40 MPa·G to complete the polymerization.

The aqueous dispersion solution taken out from the autoclave had a solid component concentration of 31% by weight.

Referential Example 3

To a 100 L volume SUS 316 made autoclave,
0.14 kg (0.3 mol) of perfluoroammonium octanoate,
0.02 kg (0.3 mol) of 25% aqueous ammonia,
0.13 kg (0.5 mol) of 2-bromotetrafluoroethoxy trifluoroethene (FBrVE, $Br-C_2F_4O-CF=CF_2$) and
33 kg (1832 mol) of ion exchange water were charged and sufficiently de-aerated, and then as a chain transfer agent
0.07 kg (0.2 mol) of 1-bromo-2-iodotetrafluoroethane and as initial charging
7.5 kg (117 mol) of vinylidene fluoride [VdF],
1.7 kg (17.0 mol) of tetrafluoroethylene [TFE], and
5.5 kg (36.7 mol) of hexafluoropropylene [HFP],
were charged and heated to 50° C. The inner pressure of the autoclave was 3.4 MPa·G.

Next, 0.02 kg (0.09 mol) of peroxoammonium disulfate was introduced into the system by a metering pump to start polymerization reaction.

When the inner pressure was lowered to 0.2 MPa·G with proceeding of the polymerization reaction, the polymerization was completed.

The aqueous dispersion solution taken out from the autoclave had a solid component concentration of 28% by weight.

Referential Example 4

The procedure of Referential Example 3 was repeated except that 0.1 kg (0.3 mol) of disodium hydrogen phosphate 12-hydrate was used in place of 0.02 kg (0.3 mol) of 25% aqueous ammonia and thereby a fluorine-containing copolymer dispersed aqueous solution was prepared.

The resulting fluorine-containing copolymer dispersed aqueous solution had a solid component concentration of 28% by weight.

Examples 1 to 3

In each of Examples 1 to 3, 10 kg of the fluorine-containing copolymer dispersed aqueous solution prepared in each of Referential Examples 1 to 3 was dropped to 10 kg of an 1% by weight ethanol solution of stearyl trimethyl ammonium chloride at ordinary temperature (25° C.), under ordinary pressure over 1 hr and thereby coagulation of the fluorine-containing copolymer was carried out. As regards to the resulting fluorine-containing copolymer, the concentrations of metals contained therein were measured.

In the resulting fluorine-containing copolymer, the concentrations of Na, Mg, Al, K, Ca, Fe, and Cu were less than 1 ppm respectively.

Comparative Example 1

In this example, 10 kg of the fluorine containing copolymer dispersed aqueous solution prepared in Referential Example 1 was dropped to 10 kg of a 10% by weight calcium hydrochloride aqueous solution over 1 hr and thereby coagulation of the fluorine containing copolymer was carried out. As regards to the resulting fluorine containing copolymer, the concentrations of metals contained therein were measured.

The resulting fluorine containing copolymer contained Na, Mg, Al, K, Ca, Fe, and Cu. The Ca concentration was 200 ppm and the concentrations of the other metals were less than 1 ppm respectively.

The results are inclusively shown in Table 1.

Comparative Example 2

In this example, 10 kg of the fluorine containing copolymer dispersed aqueous solution prepared in Referential Example 2 was dropped to 10 kg of a 10% by weight sodium hydrochloride aqueous solution over 1 hr and thereby coagulation of the fluorine containing copolymer was carried out. As regards to the resulting fluorine containing copolymer, the concentrations of metals contained therein were measured.

The resulting fluorine containing copolymer contained Na, Mg, Al, K, Ca, Fe, and Cu. The Na concentration was 50 ppm and the concentrations of the other metals were less than 1 ppm respectively.

The results are inclusively shown in Table 1.

Comparative Example 3

In this example, 10 kg of the fluorine containing copolymer dispersed aqueous solution prepared in Referential Example 3 was dropped to 10 kg of a 10% by weight potassium alum aqueous solution over 1 hr and thereby coagulation of the fluorine containing copolymer was carried out. As regards to the resulting fluorine containing copolymer, the concentrations of metals contained therein were measured.

The resulting fluorine containing copolymer contained Na, Mg, Al, K, Ca, Fe, and Cu. The Al concentration was 27 ppm, The K concentration was 10 ppm and the concentrations of the other metals were less than 1 ppm respectively.

The results are inclusively shown in Table 1.

Comparative Example 4

In this example, 10 kg of the fluorine containing copolymer dispersed aqueous solution prepared in Referential Example 4 was subjected to freeze coagulation at −25° C. As regards to the resulting fluorine containing copolymer, the concentrations of metals contained therein were measured.

The resulting fluorine containing copolymer contained Na, Mg, Al, K, Ca, Fe, and Cu. The Na concentration was 10 ppm and the concentrations of the other metals were less than 1 ppm respectively.

The results are inclusively shown in Table 1.

Comparative Example 5

In this example, 10 kg of the fluorine containing copolymer dispersed aqueous solution prepared in Referential Example 4 was dropped to 10 kg of an 1% by weight ethanol solution of stearyl trimethyl ammonium chloride over 1 hr and thereby coagulation of the fluorine containing copolymer was carried out. As regards to the resulting fluorine containing copolymer, the concentrations of metals contained therein were measured.

The resulting fluorine containing copolymer contained Na, Mg, Al, K, Ca, Fe and Cu. The Na concentration was 2 ppm and the concentrations of the other metals were less than 1 ppm respectively.

The results are inclusively shown in Table 1.

Example 4 and Comparative Example 6

In each of Example 4 and Comparative Example 6, a fluorine containing elastomer composition prepared by using the fluorine containing copolymer obtained in each of Example 3 and Comparative Example 3 in accordance with the compounding order as shown in Table 2 was subjected to mastication by a 8 inch roll mill and then vulcanized in the vulcanization conditions as shown in table 2 to prepare a vulcanization molded article.

As regards to the resulting vulcanization molded article, the metal content was measured in accordance with the measuring method as described above. The results obtained are shown in Tables 1 to 2.

As is clear from Tables 1 and 2, of the vulcanization molded articles obtained above, the vulcanization molded article prepared in Example 4 using the fluorine containing copolymer prepared in Example 3 had a decreased concentration of the metal elements as compared with the vulcanization molded article prepared in Comparative Example 6 using the fluorine containing copolymer prepared in Comparative Example 3. Therefore, the vulcanization molded article prepared in Example 4 is suitably used for transportation rolls, sealing materials, hoses, tubes and the like in the field of liquid crystal and semiconductor production apparatuses, or polymer matrixes for forming polymer electrolytes of lithium secondary batteries in the electric field.

TABLE 1

| | Metal Kind and Concentration thereof [ppm] | | | | | | |
|---|---|---|---|---|---|---|---|
| | Na | Mg | Al | K | Ca | Fe | Cu |
| Ex. 1 | <1 | <1 | <1 | <1 | <1 | <1 | <1 |
| Ex. 2 | <1 | <1 | <1 | <1 | <1 | <1 | <1 |
| Ex. 3 | <1 | <1 | <1 | <1 | <1 | <1 | <1 |
| Ex. 4 | <1 | <1 | <1 | <1 | <1 | <1 | <1 |
| Com. Ex. 1 | <1 | <1 | <1 | <1 | 200 | <1 | <1 |
| Com. Ex. 2 | 50 | <1 | <1 | <1 | <1 | <1 | <1 |
| Com. Ex. 3 | <1 | <1 | 27 | 10 | <1 | <1 | <1 |
| Com. Ex. 4 | 10 | <1 | <1 | <1 | <1 | <1 | <1 |
| Com. Ex. 5 | 2 | <1 | <1 | <1 | <1 | <1 | <1 |
| Com. Ex. 6 | <1 | <1 | 25 | 9 | <1 | <1 | <1 |

TABLE 2

| Component: parts by weight | Ex. 4 | Com. Ex. 6 |
|---|---|---|
| Fluorine containing copolymer in Ex. 3 | 100 | — |
| Fluorine containing copolymer in Com. Ex. 3 | — | 100 |
| Triallyl isocyanate | 5.0 | 5.0 |
| 2,5-dimethyl-2,5-di(tert-butyl-peroxy)hexane | 1.0 | 1.0 |
| Primary vulcanization conditions | 180° C., 6 min. | 180° C., 6 min. |
| Secondary vulcanization conditions | 200° C., 15 hr. | 200° C., 15 hr. |

The invention claimed is:

1. A process for preparing a fluorine containing copolymer by an emulsion polymerization method in the presence of a pH modifier wherein the pH modifier is aqueous ammonia and wherein a coagulating agent comprising a cationic surfactant and a water soluble organic solvent is used in the preparation of the fluorine containing copolymer by coagulating a fluorine containing copolymer in a fluorine containing copolymer dispersed aqueous solution prepared by the emulsion polymerization method, the said cationic surfactant represented by the following formula:

$$(R_4N^+)X^-$$

wherein R is any one of an alkyl group of 1 to 22 carbon atoms, a fluoroalkyl group and a hydrogen atom, four R's may be the same or different, provided that four R's are not hydrogen atoms simultaneously, and X is a halogen atom.

2. The process for preparing a fluorine containing copolymer according to claim 1 wherein the emulsion polymerization is carried out in the presence of an anionic surfactant as an emulsifying agent.

3. The process for preparing a fluorine containing copolymer according to claim 1, wherein the amount of the cationic surfactant is 0.3 to 40 parts by weight based on 100 parts by weight of the water soluble organic solvent.

4. The process for preparing a fluorine containing copolymer according to claim 1, wherein the cationic surfactant is an alkyl ammonium chloride represented by the formula [I]:

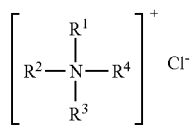

wherein $R^1$, $R^2$, $R^3$ and $R^4$ may be the same or different, $R^1$ is an alkyl group, $R^2$, $R^3$ and $R^4$ are each independently selected from hydrogen, an alkyl group, or an alkyl group substituted with fluorine.

5. The process for preparing a fluorine containing copolymer according to claim 4, wherein the alkyl ammonium chloride is selected from the group consisting of monoalkyl monomethyl ammonium chlorides, monoalkyl dimethyl ammonium chlorides, monoalkyl trimethyl ammonium chlorides, dialkyl dimethyl ammonium chlorides, trialkyl monomethyl ammonium chlorides, tetra-alkyl ammonium chlorides and perfluoroalkyl ammonium chlorides.

6. The process for preparing a fluorine containing copolymer according to claim 5, wherein the monoalkyl trimethyl ammonium chloride is selected from the group consisting of lauryl trimethyl ammonium chloride, dodecyl trimethyl ammonium chloride and stearyl trimethyl ammonium chloride.

7. The process for preparing a fluorine containing copolymer according to claim 5, wherein the dialkyl dimethyl ammonium chloride is distearyl dimethyl ammonium chloride.

* * * * *